United States Patent
Kim et al.

(10) Patent No.: US 10,665,882 B2
(45) Date of Patent: May 26, 2020

(54) REDOX FLOW BATTERY

(71) Applicant: Standard Energy Co., Ltd., Daejeon (KR)

(72) Inventors: Bugi Kim, Daejeon (KR); Kihyun Kim, Daejeon (KR); Bumhee Cho, Daejeon (KR); Damdam Choi, Daejeon (KR)

(73) Assignee: Standard Energy Co., Ltd., Daejeon (KR)

( * ) Notice: Subject to any disclaimer, the term of this patent is extended or adjusted under 35 U.S.C. 154(b) by 0 days.

(21) Appl. No.: 15/965,866

(22) Filed: Apr. 28, 2018

(65) Prior Publication Data
US 2018/0269514 A1 Sep. 20, 2018

(30) Foreign Application Priority Data
Mar. 2, 2017 (KR) .......... 10-2017-0027043

(51) Int. Cl.
*H01M 8/18* (2006.01)
*H01M 8/04746* (2016.01)
(Continued)

(52) U.S. Cl.
CPC ....... *H01M 8/188* (2013.01); *H01M 8/04104* (2013.01); *H01M 8/04186* (2013.01);
(Continued)

(58) Field of Classification Search
CPC ......... H01M 8/04104; H01M 8/04186; H01M 8/04201; H01M 8/04276; H01M 8/04753;
(Continued)

(56) References Cited

U.S. PATENT DOCUMENTS 6,692,862 B1 * 2/2004 Zocchi ............... H01M 8/04119
429/50
9,350,039 B2 * 5/2016 Perry .................. H01M 8/0687
(Continued)

FOREIGN PATENT DOCUMENTS

EP  3 249 731 A1  11/2017
JP  H05-164053  6/1993
(Continued)

OTHER PUBLICATIONS

International Search Report dated Aug. 10, 2018 in PCT Application No. PCT/KR2018/004839; 2 pages.
(Continued)

*Primary Examiner* — Wyatt P McConnell
(74) *Attorney, Agent, or Firm* — Knobbe, Martens, Olson & Bear LLP

(57) ABSTRACT

A redox flow battery according to the present invention is provided with a battery module including a battery cell or a stack, and a pair of electrolyte tanks, and a replacement of a pump is applied for each battery module to transfer electrolyte to the battery cell and the stack such that shunt current is reduced. In addition, each battery module is provided with the pair of the electrolyte tanks such that a transfer distance of the electrolyte can be reduced, and a fluid controller using pressure instead of a pump for each module such that power required for driving the pump can be reduced and efficiency of the battery can be improved.

11 Claims, 14 Drawing Sheets

(51) Int. Cl.
*H01M 8/04082* (2016.01)
*H01M 8/04089* (2016.01)
*H01M 8/04186* (2016.01)
*H01M 8/06* (2016.01)
*H01M 8/04276* (2016.01)

(52) U.S. Cl.
CPC ... *H01M 8/04201* (2013.01); *H01M 8/04276* (2013.01); *H01M 8/04753* (2013.01); *H01M 8/04783* (2013.01); *H01M 8/0693* (2013.01); *Y02E 60/528* (2013.01)

(58) Field of Classification Search
CPC .......... H01M 8/04783; H01M 8/0693; H01M 8/188; Y02E 60/528
See application file for complete search history.

(56) References Cited

U.S. PATENT DOCUMENTS

| | | | | |
|---|---|---|---|---|
| 2013/0336826 A1* | 12/2013 | Kim | ................ | F04B 43/02 |
| | | | | 417/474 |
| 2018/0323484 A1* | 11/2018 | Magnes | ................ | H01M 8/188 |

FOREIGN PATENT DOCUMENTS

| | | |
|---|---|---|
| JP | 10-281055 | 10/1998 |
| JP | 2003-035265 | 2/2003 |
| JP | 2006-342723 | 12/2006 |
| JP | 2007-311210 | 11/2007 |
| JP | 2009-016216 | 1/2009 |
| JP | 2009-016218 | 1/2009 |
| JP | 2010-170782 | 8/2010 |
| JP | 2015-534210 | 11/2015 |
| KR | 10-2011-0119775 | 11/2011 |
| KR | 10-2011-0135376 | 12/2011 |
| KR | 10-2012-0028302 | 3/2012 |
| KR | 10-1176126 | 8/2012 |
| KR | 10-2013-0055855 | 5/2013 |
| KR | 10-2013-0140342 | 12/2013 |
| KR | 10-1357822 | 1/2014 |
| KR | 10-1394255 | 5/2014 |
| KR | 10-1459927 | 11/2014 |
| KR | 10-2015-0047529 | 5/2015 |
| KR | 10-2016-0052556 | 5/2016 |
| KR | 10-2017-0132005 | 5/2016 |
| KR | 10-2016-0078566 | 7/2016 |
| KR | 10-1688975 | 12/2016 |
| KR | 10-2017-0005629 | 1/2017 |
| KR | 10-2017-0020687 | 2/2017 |
| KR | 10-2017-0037388 | 4/2017 |
| KR | 10-1742980 | 5/2017 |
| KR | 10-2017-0076514 | 7/2017 |
| KR | 10-1803825 | 11/2017 |
| KR | 101803824 B1 | 1/2018 |
| KR | 10-1862725 | 5/2018 |
| WO | WO 2015/003212 A1 | 1/2015 |
| WO | WO-2015003212 A1 * | 1/2015 ............ H01M 2/40 |

OTHER PUBLICATIONS

International Search Report dated Aug. 28, 2018 in PCT Application No. PCT/KR2018/005243; 4 pages.

Extended European Search Report dated Feb. 18, 2019 in European Patent Application No. 18168778.1; 7 pages.

Effect of Electrolyte Flow Rates on the Performance of Vanadium Redox Flow Battery (Trans. of the Korean Hydrogen and New Energy Society(Aug. 2015), vol. 26, No. 4, pp. 324-330).

Office Action dated May 28, 2019 in Japanese Patent Application No. 2018-083262; 6 pages.

* cited by examiner

REDOX FLOW BATTERY

CROSS REFERENCE TO RELATED APPLICATION

The present application claims priority to Korean Patent Application No. 10-2017-0027043, filed Mar. 2, 2017, the entire contents of which are incorporated by this reference herein for all purposes.

TECHNICAL FIELD

The present invention relates generally to a redox flow battery. More particularly, the present invention relates to a redox flow battery in which a plurality of battery modules is connected to each other, each of the battery modules including a pair of electrolyte tanks respectively storing a positive electrolyte and a negative electrolyte for each battery cell and at least one fluid controller for transferring electrolyte from the electrolyte tank to the battery cell, such that response time is reduced, efficiency is improved, and shunt current is prevented.

BACKGROUND

Recently, renewable energy such as solar energy and wind energy has attracted attention as a method to suppress greenhouse gas emissions, which are a major cause of global warming. However, renewable energy is heavily influenced by location and natural conditions. Moreover, since the output fluctuation is large, it is impossible to uniformly supply the energy continuously. Therefore, in order to use renewable energy for home or commercial use, a system that stores energy when the output is high and uses stored energy when the output is low has been introduced and used.

As such an energy storage system, a large-capacity secondary battery is used. For example, a large-capacity secondary battery storage system has been introduced into a large-scale solar power generation and wind power generation complexes. The secondary battery for storing a large amount of electric power includes a lead-acid battery, a sodium-sulfur (NaS) battery, and a redox flow battery (RFB).

Although the lead-acid battery is widely used in comparison with other batteries, it has disadvantages such as low efficiency, high maintenance cost due to periodic replacement, and generation of industrial waste generated when replacing the battery disposed. Although the NaS battery has high energy efficiency, the NaS battery operates at a high temperature of 300° C. or higher, which is problematic. The redox flow battery is capable of operating at room temperature and a capacity and output thereof can be designed independently whereby much research has been conducted recently for a large capacity secondary battery.

The redox flow battery is configured with a stack in which a membrane, an electrode, and a bipolar plate are repeatedly arranged in a series, similar to a fuel cell battery such that the redox flow battery is a secondary battery that can be charged with and discharge electric energy. In the redox flow battery, a positive electrolyte and a negative electrolyte, respectively supplied from the positive and negative electrolyte storage tanks of each side of the membrane, circulate to perform ion exchange and electrons move in above process to charge and discharge. The redox flow battery is known to be most suitable for energy storage system (ESS) because the redox flow battery has long life span and can be manufactured as medium and large sized systems of a kW to MW class.

However, the redox flow battery has a structure in which the tanks for storing a positive electrolyte and a negative electrolyte are disposed with a certain space (for example, a structure in which the tanks are disposed with a certain space on each side of the stack or below the stack). There is a disadvantage with respect to overall system volume, in which electrolyte circulation pipes connect the stack and the tanks to each other, compared to other power storage devices based on similar power storage capacities such as the lead-acid battery, a lithium ion battery, and the lithium-sulfur battery.

In addition, since a plurality of electrolyte circulation pipes are required to connect the stack, the pump, and the electrolyte tank, a pump capacity exceeding a predetermined standard is required in order to supply the electrolyte to each stack uniformly. As a length of the electrolyte circulation pipe becomes longer, the required capacity of the pump is increased such that a size of the pump and the manufacturing cost of the battery are increased, and an overall power efficiency is lowered due to the increase of the power consumption due to the increase of the pump capacity.

In addition, a general battery should have a high responsiveness in charging and discharging operations. However, in case of the redox flow battery, when operating for charging and discharging in a stopped state, it takes time until the electrolyte is circulated to the inside of the stack by the pump. In addition, the responsiveness is lowered over time, and cost is increased because a plurality of chemical resistance-pipes connecting the cell, the stack, and the pump is required.

In a typical redox flow battery, electrolyte is supplied to each cell through each manifold. However, because the electrolyte filled in the manifolds serve as an electric passage for connecting each cell, it can be an electron movement path such that a shunt current is generated through the passage. Thus, a part of the energy is lost due to the shunt current at charging and discharging processes, whereby the shunt current becomes a major cause of reduced efficiency, component damage, and uneven cell performance. In order to reduce the shunt current, increasing a length of the manifold and reducing a cross-sectional area of the manifold have been adopted. However, a flow resistance of the fluid is increased in above solutions such that pumping loss is generated, therefore, an alternative to overcome the problem is required.

SUMMARY

Accordingly, the present invention has been made keeping in mind the above problems occurring in the related art, and the present invention is intended to propose a redox flow battery in which a pair of electrolyte tanks storing electrolyte are provided for a battery cell or for each stack unit in which a plurality of battery cells are stacked, or a plurality of battery cells shares same electrolyte tanks, and also a replacement of a pump is applied to transfer the electrolyte to the battery cell and the stack such that deterioration of battery efficiency due to the installation of a plurality of pumps is overcome and generation of shunt current is prevented.

In order to achieve the above object, according to one aspect of the present invention, there is provided a redox flow battery.

The redox flow battery is provided with at least one battery module including a battery cell, an electrolyte tank, an electrolyte flow passage, and a fluid controller transferring a pressure applied from an outside of the battery module to the electrolyte flow passage, the battery module circulating electrolyte for respective battery modules or for a predetermined number of battery modules independently to charge or discharge the battery.

The battery module may include: at least one battery cell including a pair of electrodes classified into a positive electrode and a negative electrode, a membrane, and a separator stacked on each outer side surface of the electrodes; a pair of electrolyte tanks provided inside the battery module, and supplying a positive electrolyte to the positive electrode and a negative electrolyte to the negative electrode; an electrolyte flow passage connecting the battery cell to the electrolyte tanks to transport the electrolyte; and at least one fluid controller positioned on the electrolyte flow passage, and transferring the pressure applied from the outside of the battery module to the electrolyte flow passage to control flow of the electrolyte.

The fluid controller may include: at least one check valve provided inside the electrolyte flow passage and allowing the electrolyte to flow in one direction; and a fluid transfer line coupled to and communicating with the electrolyte flow passage at a location neighboring the check valve in order to directly transfer the pressure applied from the outside of the battery module to the electrolyte flow passage.

Alternatively, the fluid controller may include: a controller housing provided at an end of the electrolyte flow passage and disposed in the electrolyte tank; a fluid transfer line transferring the pressure applied from the outside of the battery module to an inside of the controller housing; and at least one check valve provided at a side surface of the controller housing, the check valve guiding electrolyte to flow from the electrolyte tank to the controller housing and guiding the electrolyte to flow from the controller housing to the electrolyte flow passage at the same time.

The battery module may be provided with at least two fluid controllers. The battery module may be provided with two fluid controllers, and a pressure supply cycle of the fluid controller may be configured such that respective positive pressure cycles or negative pressure cycles of the fluid controllers are overlapped with each other. The fluid controller may be provided with at least one pressure control valve.

In addition, the fluid transfer line may further include at least one fluid filter. Alternatively, the fluid transfer line may further include at least one electrolyte inflow prevention device selected from a membrane, a shut-off valve, a check valve, and a floating valve.

The redox flow battery according to the present invention is provided with a battery module including a battery cell or a stack, a pair of electrolyte tanks, and a fluid controller using pressure instead of a pump for each module for transferring electrolyte, the fluid controller being applied to each battery module such that generation of shunt current is dramatically reduced or eliminated.

In addition, when a pair of electrolyte tanks is provided for each battery module, a transfer distance of the electrolyte can be reduced, the power required for driving the pump can be saved, and efficiency of the battery can be improved.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE DISCLOSURE

Figure 1:
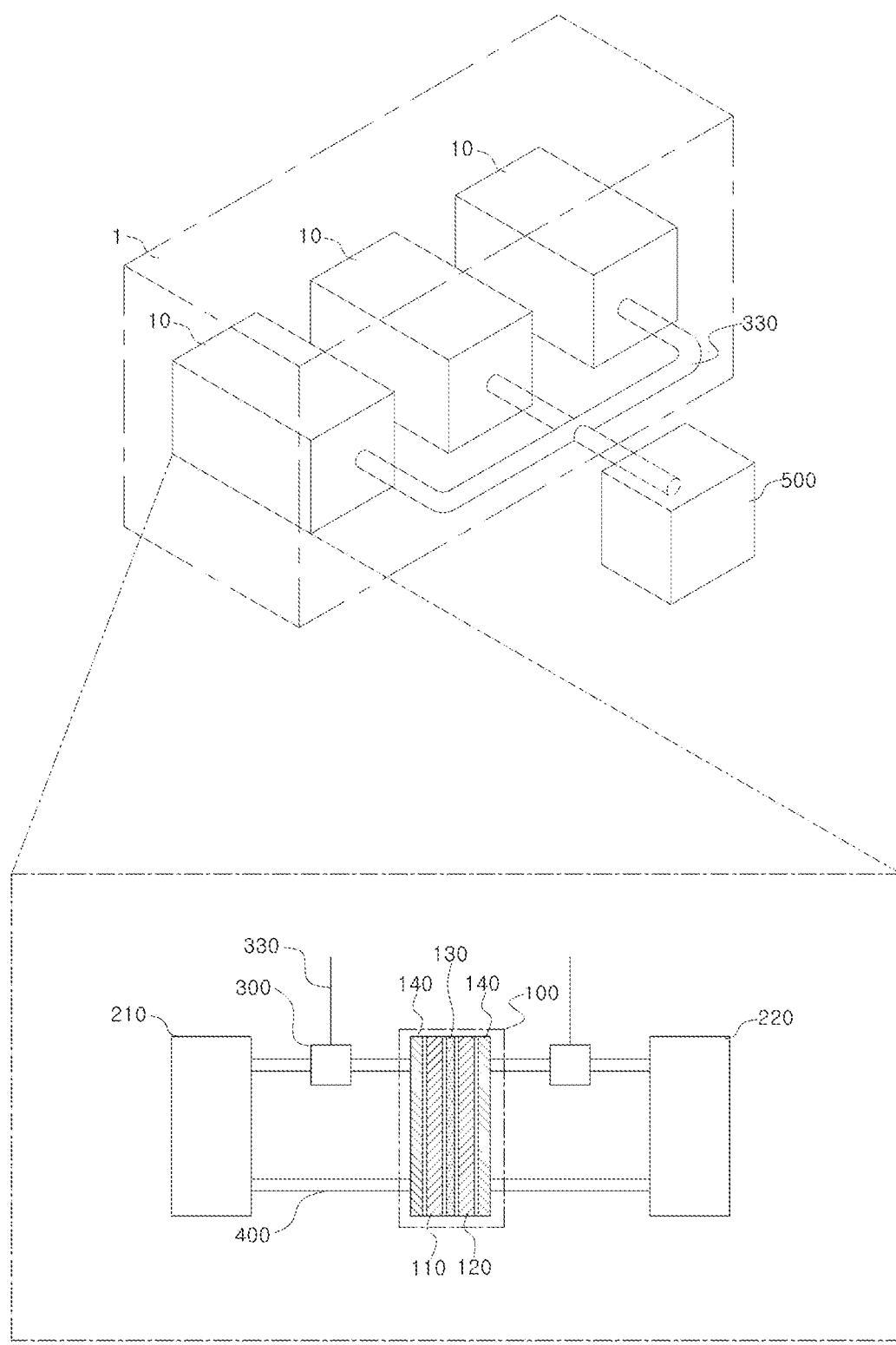
FIG. 1 shows a configuration of a redox flow battery provided with a plurality of battery modules according to an embodiment of the present invention, the battery modules being connected with each other.

Hereinbelow, a redox flow battery according to the present invention will be described in detail by describing specific examples of the present invention with reference to the accompanying drawings. Embodiments of the present invention are presented to make complete disclosure of the present invention and help those who are ordinarily skilled in the art best understand the invention.

Various changes to the following embodiments are possible and the scope of the present invention is not limited to the following embodiments.

Unless otherwise defined, all terms including technical and scientific terms used herein have the same meaning as commonly understood by one of ordinary skill in the art to which this invention belongs. In the following description, it is to be noted that, when the functions of conventional elements and the detailed description of elements related with the present invention may make the gist of the present invention unclear, a detailed description of those elements will be omitted.

In addition, below drawings are provided by way of example so that the idea of the present invention can be sufficiently transferred to those skilled in the art to which the present invention pertains. Therefore, the present invention is not limited to the accompanying drawings provided below, but may be modified in many different forms. In addition, the accompanying drawings suggested below will be exaggerated in order to make clear the spirit and scope of the present invention. Furthermore, like reference numerals denote elements throughout the specification.

The terminology used herein is for the purpose of describing particular embodiments only and is not intended to be limiting. As used herein, the singular forms "a", "an", and "the" are intended to include the plural forms as well, unless the context clearly indicates otherwise.

Further, when describing the components of the present invention, terms such as first, second, A, B, (a) or (b) may be used. Since these terms are provided merely for the purpose of distinguishing the components from each other, they do not limit the nature, sequence or order of the components. It will be understood that when an element is referred to as being "coupled" or "connected" to another element, it can be directly coupled or connected to the other element or intervening elements may be present therebetween.

In the present invention, the term "battery cell" is a minimum unit in which charging and discharging occur through electrolyte, and includes a membrane, separator, etc. in which ion exchange occurs.

In the present invention, the term "stack" means that a plurality of battery cells are stacked or configured.

The inventor of the present invention conducted research to solve physical problems of a redox flow battery in the related art such as an increase in a length of an electrolyte circulation pipe, resulting in an increase of a battery volume, requiring a high performance pump or an increase of the number of pumps, and general problems such as increases of a pump size and manufacturing cost of the battery for moving the electrolyte, a decrease in responsiveness, and pumping loss.

As shown in FIGS. 1 to 13, a redox flow battery according to the present invention is provided with at least one battery module 10, the battery module 10 including a battery cell 100, a pair of electrolyte tanks 200, an electrolyte flow passage 400, and a fluid controller 300 transferring a pressure applied from an outside of the battery to the electrolyte flow passage 400, and battery modules being connected with each other electrically. In addition, the battery module circulates electrolyte independently to charge and discharge battery.

The battery module 10 will be described in detail with reference to FIG. 2. The battery module 10 includes at least one battery cell 100 including a pair of electrodes classified into a positive electrode 110 and a negative electrode 120, a membrane 130 disposed between the electrodes, and a separator 140 stacked on each outer side surface of the electrodes, a pair of electrolyte tanks 200 provided inside the battery module 10, and supplying a positive electrolyte to the positive electrode and a negative electrolyte to the negative electrode respectively, the electrolyte flow passage 400 connecting the battery cell to the electrolyte tanks to transport the electrolyte, and at least one fluid controller 300 positioned on the electrolyte flow passage, and transferring the pressure applied from the outside of the battery module to the electrolyte flow passage to control flow of the electrolyte.

However, in the present invention, the battery cell is described with reference to a conventional redox flow battery. Thus, considering the relation with the present invention, description of elements not related with the present invention, such as an electrode, a membrane, a separator, and the like, may be omitted.

Meanwhile, the configuration and function of an end plate, the electrolyte tank 200, and the pump are well known to those skilled in the art, so the present invention will not be described in detail herein.

Hereinbelow, each components of the present invention will be described in detail with reference to drawings.

FIG. 1 briefly shows a configuration of the redox flow battery according to the present invention, in which a plurality of battery modules 10 is electrically connected to each other through a module connection unit 600 and the battery module is connected to a pressure generator 500 through a fluid transfer line 330 for transferring the electrolyte. Alternatively, the battery modules may be configured to operate independently without electrical connection therebetween, as necessary.

The redox flow battery according to the present invention is characterized in that the electrolyte is circulated independently without interference and exchange of the electrolyte among the battery modules, or several battery modules share the electrolyte tank, thereby minimizing generation of shunt current. Alternatively, a passage may be configured through which the electrolyte flows between the battery modules to mix the electrolyte between each battery module. The present invention is not limited thereto.

Figure 2:
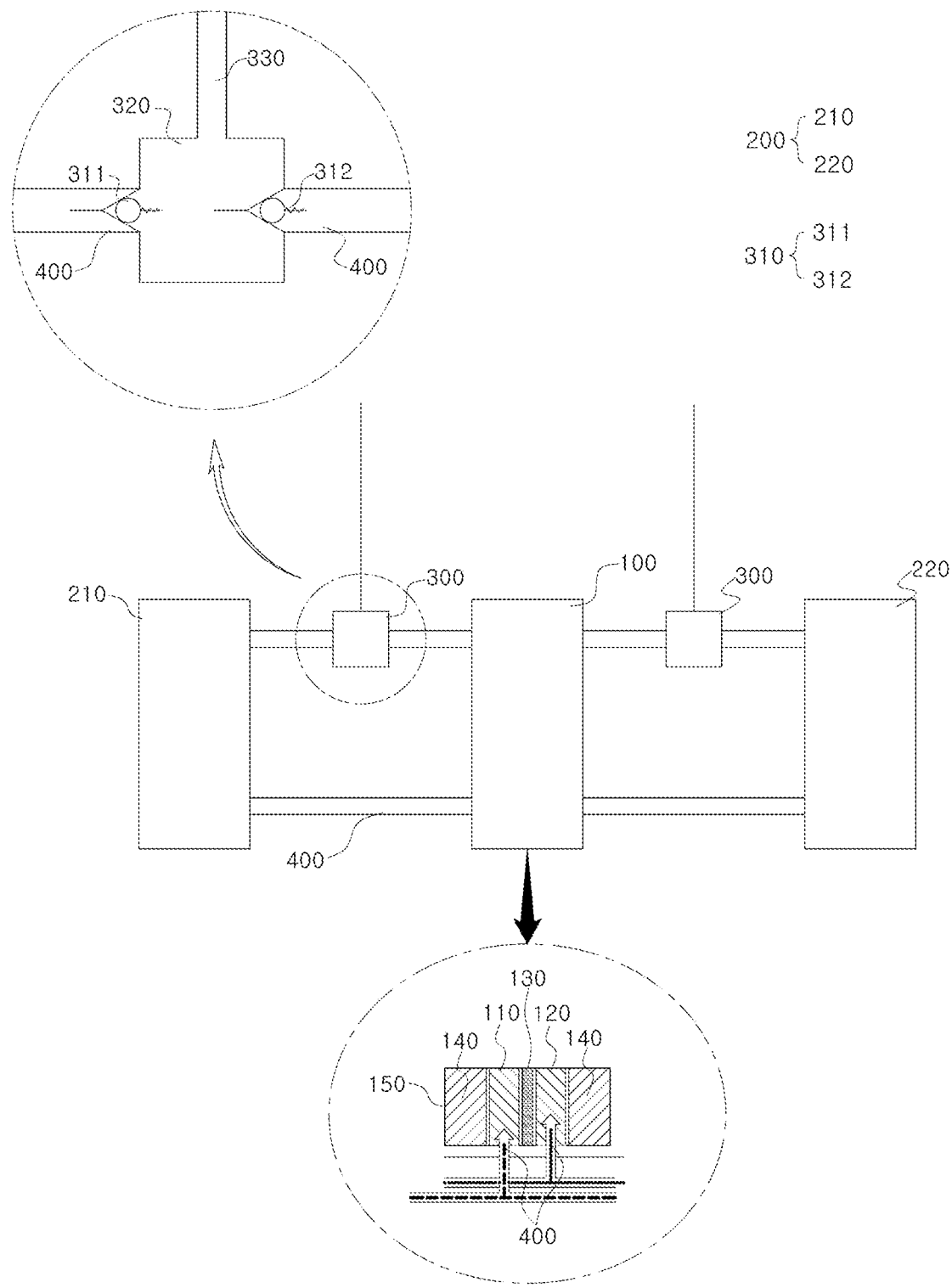
FIG. 2 shows an inner structure of the battery module according to the embodiment of the present invention.

FIG. 2 briefly shows a configuration of the battery module 10, in which the battery cell 100, the positive electrolyte tank 210, and the negative electrolyte tank 220 are provided and connected to the battery cell 100 by the electrolyte flow passage 400. Meanwhile, the electrolyte flow passage 400 is provided with the fluid controller 300 to transfer the electrolyte by using pressure applied from the outside.

As shown in a lower portion of FIG. 2, the battery cell 100 of the present invention may include the pair of electrodes classified into the positive electrode 110 and the negative electrode 120, the membrane 130 disposed between the electrodes, and the separator 140 disposed at each outer side of the positive electrode and the negative electrode to be spaced apart therefrom respectively. The positive electrode, the negative electrode, the membrane, and the separator are disposed inside a housing 150 such that electrochemical reactions such as movement of the electrolyte, and charging and discharging occur in the housing.

The positive electrolyte and the negative electrolyte supplied to the battery cell are transferred from each of the electrolyte tanks to the inside of the housing through the electrolyte flow passage such that the reaction proceeds and the reacted electrolyte flows back into each of the electrolyte tanks through the electrolyte flow passage.

In the present invention, the fluid controller 300 may be provided on the electrolyte flow passage through which the electrolyte is introduced into the battery cell, to replace an existing pump and circulate the electrolyte. The fluid controller is provided to allow the electrolyte to flow in a predetermined direction by using a change in pressure. A structure and a type of the fluid controller are not limited except for a condition that the fluid controller prevents backflow and allows the electrolyte to be transferred due to a change in pressure.

An example of the fluid controller is a check valve. The check valve will be described in detail with reference to an upper left portion of FIG. 2. A pair of check valves 311 and 312 are provided, each of the check valves allows fluid to flow inside the electrolyte flow passage in one direction, and the fluid transfer line 330 is provided between the check valves, the fluid transfer line 330 coupled to and communicating with the electrolyte flow passage and transferring a pressure to the electrolyte flow passage directly.

That is, when the pressure is transferred from the outside through the fluid transfer pipe, a pressure change occurs naturally between a first check valve and a second check valve, which are the pair of check valves, and the electrolyte flows in one direction.

For example, when the fluid transfer line operates to lower a pressure in a space between the first check valve and the second check valve (negative pressure), the pressure in the space between the check valves is lowered naturally. Therefore, electrolyte existing over the first check valve flows into the space between the check valves to maintain pressure balance and the second check valve is closed such that backflow of the electrolyte is prevented. In addition, when a pressure applied from the outside is increased (positive pressure), electrolyte existing between the check valves passes through the second check valve naturally and flows to the battery cell, and the first check valve is closed. The electrolyte flows into the battery cell and the stack, and circulates through repetition of the process.

In FIG. 2, etc., the fluid controller is provided with the pair of check valves. However, a fluid flow resistance inside the battery cell is generally high such that the backflow is partially prevented without the second check valve. Thus, the fluid controller may be provided with only one check valve or on the other hand, may be provided with a plurality of check valves. A structure of the fluid controller may be freely changed within the scope of achieving the object of the present invention, and modifications, equivalents, or alternatives also fall within the scope of the present invention.

The embodiment of the present invention describes that the fluid controller applies positive pressure to the battery cell to supply the electrolyte, but not limited thereto. The fluid controller may be configured to connect to the electrolyte flow passage through which the electrolyte is discharged from the battery cell and the fluid controller applies negative pressure to the battery cell such that the electrolyte circulates to battery cell. In above case, each operation direction of the check valves may be configured to be reversed. It is preferable that a pressure supply cycle of the fluid controller described in FIG. 8 is such that the positive and negative pressures operate inversely with each other.

According to the present invention, there is no need to drive a motor for each battery module according to the above-described structure, so that it is possible to increase energy efficiency and reduce a circulation distance of the electrolyte, thereby increasing responsiveness of the battery and minimizing use of acid-resistant pipes.

In the present invention, since the fluid controller guides the electrolyte to flow, the positive and negative pressures are required for above a predetermined level. The present invention does not limit ranges of the positive and negative pressures and the ranges may be higher or lower than atmospheric pressure on condition that the pressure is sufficient to guide the flow of the electrolyte. The pressure range may be appropriately regulated regardless of upper and lower limits of the pressure, for example, positive pressure to negative pressure, positive pressure to atmospheric pressure, atmospheric pressure to negative pressure, or the like.

In addition, to guide the electrolyte to flow smoothly and to increase an amount of the electrolyte supplied to the battery cell, a controller housing 320 may be provided as shown in an upper portion of FIG. 2, the controller housing 320 configuring a compartment between the check valves.

A device and a type of the fluid for transferring the pressure to the fluid controller are not limited in the present invention. For example, in order to generate the positive pressure, a compressor or a pump may be provided as the pressure generator 500 for compressing a fluid to transfer the pressure. In addition, in order to generate the negative pressure, a vacuum device, a suction device, or an ejector having a venturi tube may be provided as the pressure generator. Gas and liquid may be used as a fluid and freely selected depending on the type of pressure generator being operated. In addition, it is possible to use either device that generates the positive pressure or negative pressure.

Furthermore, the pressure generator according to the present invention may be supplemented with the fluid by a separate supply device (not shown) to compensate for the fluid lost during operation. The pressure generator may be provided with a pressure gauge (not shown) to maintain a magnitude of the pressure applied to the fluid controller constant. Thus, when the pressure gauge determines by measurement that positive and negative pressures are equal to or below a predetermined level, the pressure generator may further include a configuration in which the fluid is injected into the pressure generator by the supply device to supplement or discharged to outside.

Figure 4:
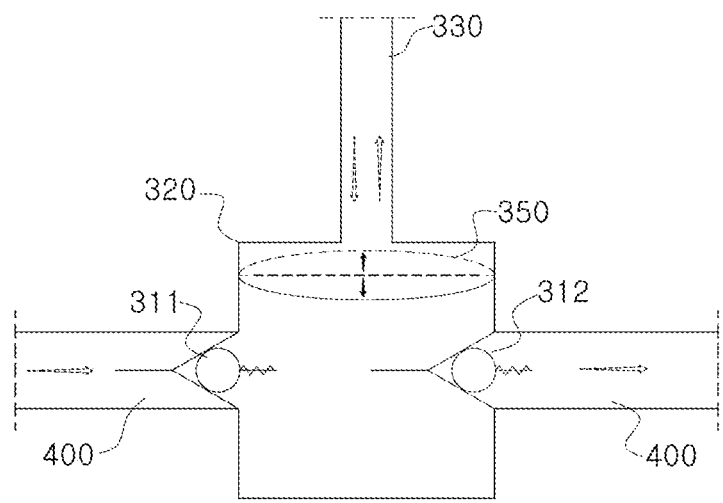
FIG. 4 shows an example of a check valve of the present invention.

FIG. 4 shows a general configuration of the fluid controller having the check valve, in which the controller housing 320 is provided with the pair of check valves 311 and 312, which directly connect with the electrolyte flow passage 400, at opposite side surfaces thereof and is directly connected to the fluid transfer line 330, which supplies pressure to the electrolyte flow passage, at an upper surface thereof. Here, the controller housing 320 may be provided with at least one electrolyte inflow prevention device 350 to prevent the fluid from flowing into the controller housing through the fluid transfer line.

The electrolyte inflow prevention device may be made of any material and be any shape with the condition that pressure is smoothly transferred and the fluid is prevented from flowing into the controller housing. For example, as shown in FIG. 4, the electrolyte inflow prevention device may be disposed in the controller housing such that the controller housing and the fluid transfer line are physically disconnected from each other and is preferably provided in a form of a flexible membrane.

Figure 3:
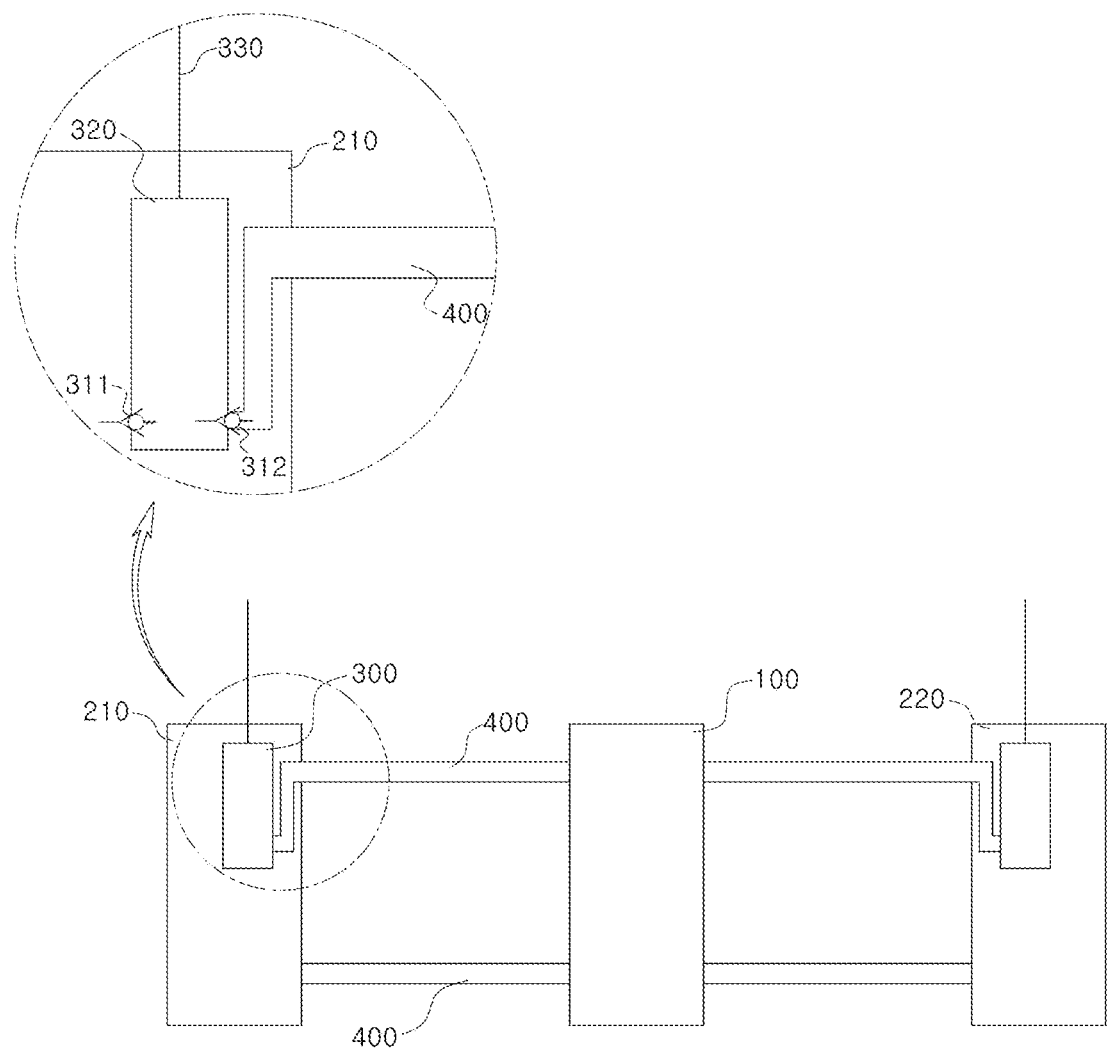
FIG. 3 shows an inner structure of a battery module according to another embodiment of the present invention.

As shown in FIG. 2, the fluid controller 300 according to the present invention may be disposed between the electrolyte tank and the battery cell. On the other hand, as shown in FIG. 3, the fluid controller 300 may be disposed inside each electrolyte tank 200. In detail, the fluid controller is disposed inside the electrolyte tank and provided an end of the electrolyte flow passage 400, and prevents mixing of the fluid and the electrolyte by the controller housing 320. The controller housing is provided with the pair of check valves 311 and 312 at each side surface thereof, in which one of the check valves operates toward an inside of the controller housing from an outside of the controller housing and a remaining one of the check valves operates toward the outside of the controller housing from the inside of the controller housing. The check valve operating toward the outside of the controller housing from the inside of the controller housing is directly connected to an end of the electrolyte flow passage. In addition, it is preferable that the check valve operating toward the inside of the controller housing from the outside of the controller housing directly contacts with the electrolyte in the electrolyte tank or is disposed inside the electrolyte by extending the pipe.

When the positive pressure is transferred to the fluid controller inside the electrolyte tank by the pressure generator, the electrolyte in the fluid controller is pushed to the electrolyte flow passage through the check valve. As a result, a level of the electrolyte in the fluid controller is decreased naturally such that a level difference between the electrolyte in the fluid controller and the electrolyte of outside occurs. When the electrolyte in the fluid controller is lowered to a predetermined level and the supply of the positive pressure is stopped, the electrolyte of the outside may flow into the fluid controller due to the level difference of the electrolyte. Therefore, the supply of the negative pressure required for electrolyte inflow can be reduced by the pressure generator and the electrolyte can flow naturally into the fluid controller without supplying the negative pressure, thereby improving efficiency of the entire redox flow battery.

In the present invention, the check valve 310 is also referred to as a non-return valve and operates to guide the flow of the electrolyte in one direction. In the present invention, it is possible that the check valve has any structure such as a ball shape as shown in FIG. 2 or a membrane shape on condition that the check valve can control the flow direction of the fluid.

Figure 5A:
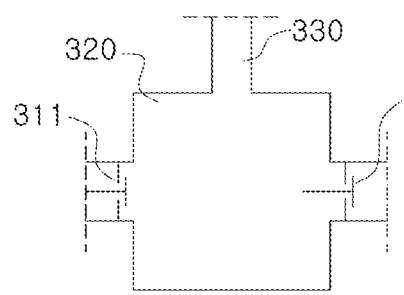
FIGS. 5A to 5C show other examples of a check valve of the present invention.
Figure 5B:
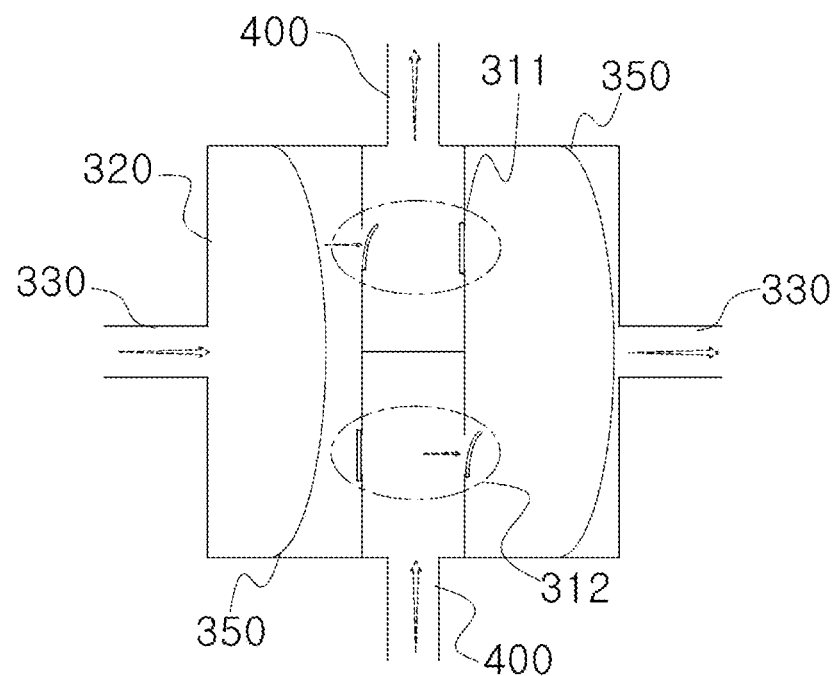

For example, the check valve may be provided as a disc shape shown in FIG. 5A or the membrane shape shown in FIG. 5B. In addition, various types of check valves may be used such as a lift check valve, a swing check valve, a swing type wafer check valve, and a split disk check valve.

Figure 5C:
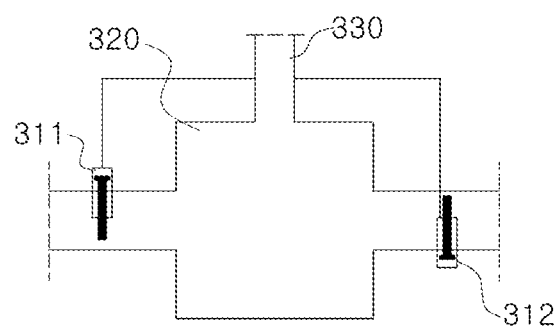

In addition to the check valves, a valve operated by pressure may also be provided, as shown in FIG. 5C. The valve is also operated in the same manner as a general check valve, and a flow resistance of a reverse direction is higher than a flow resistance of a forward direction with respect to the electrolyte flow so that the fluid generally flows in the forward direction whereby the valve also falls within the check valve category. That is, regardless of the shape of the check valve, the flow resistance of the reverse direction is higher than the flow resistance of the forward direction with respect to the electrolyte flow so that the fluid generally flows in the forward direction, whereby the valve also falls within the check valve category.

Figure 6:
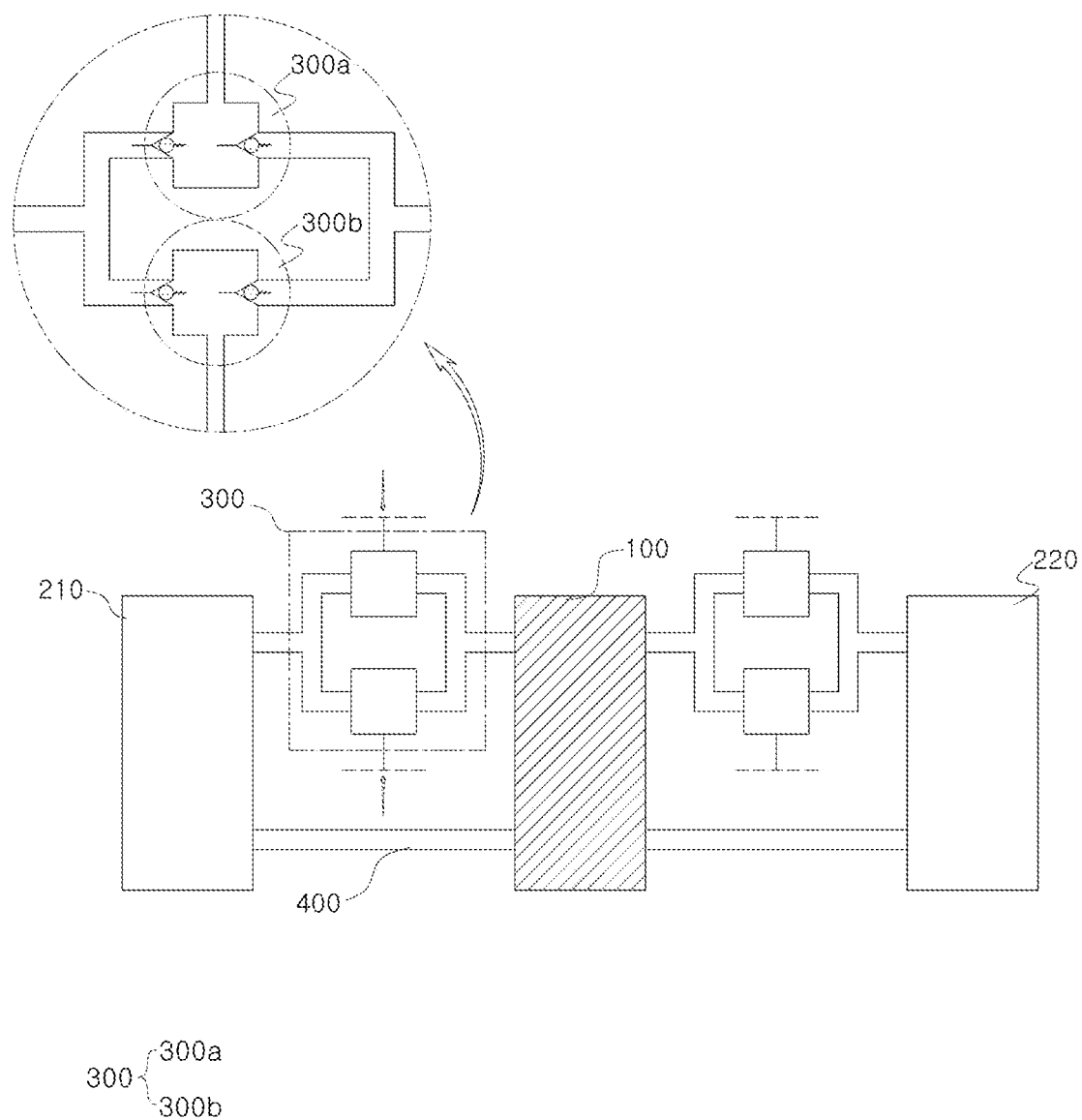
FIGS. 6 and 7 show redox flow batteries each provided with two fluid controllers.
Figure 7:
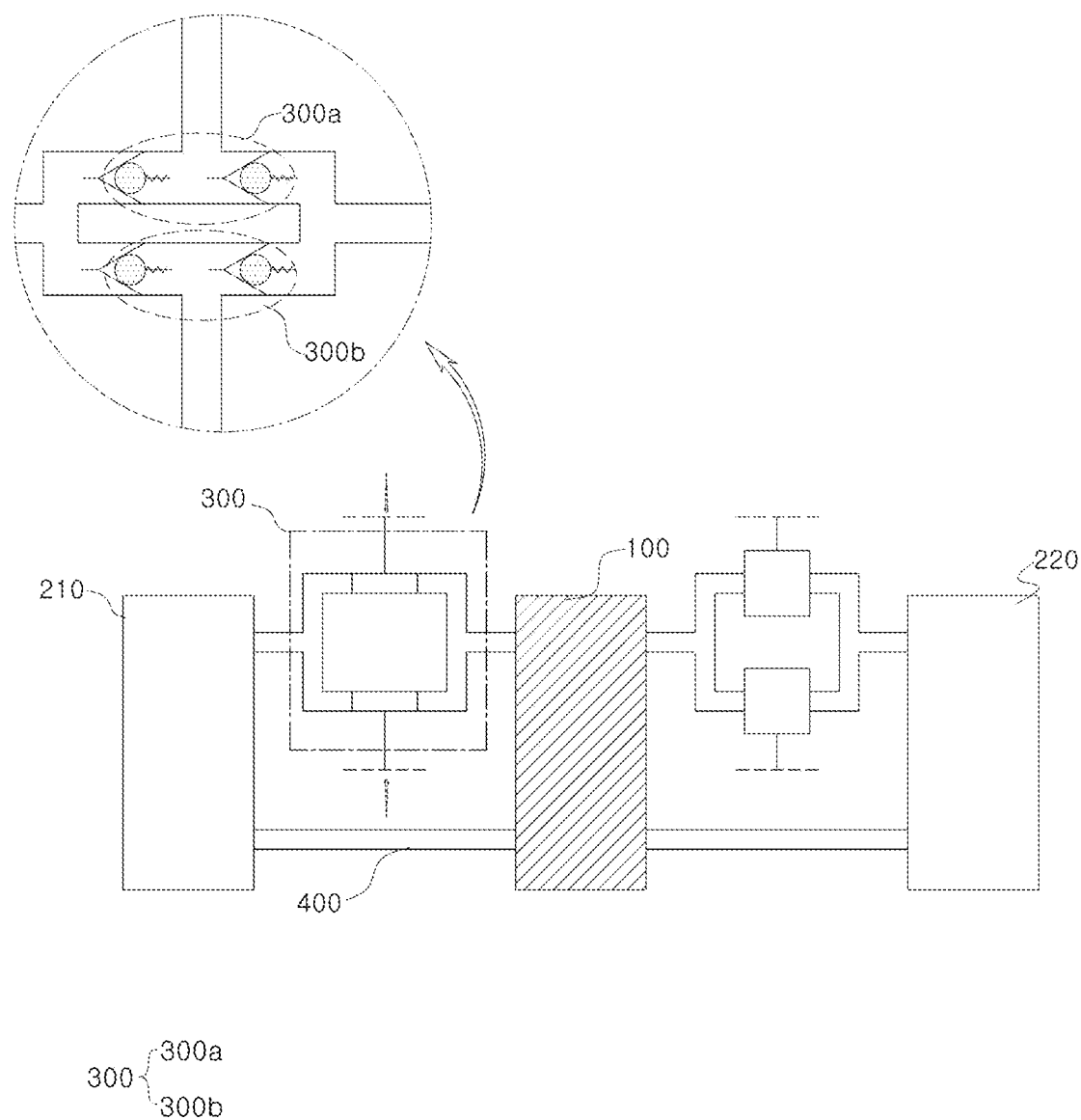

In addition, the battery module may be provided with at least two fluid controllers 300 as shown in FIGS. 6 and 7. In general, when the fluid transfer line of the fluid controller is only one, the electrolyte is supplied to the battery cell only in the case of the positive pressure such that it is difficult to form a continuous electrolyte flow. In addition, the electrolyte remains in the cell for a predetermined time whereby a performance of the cell deteriorates.

In order to solve above problems in the present invention, at least two fluid controllers connect to each other to guide a continuous flow. Referring to FIG. 7, the positive pressure is supplied to a first fluid controller 300a and the second fluid controller 300b is supplied with the negative pressure. That is, since the positive pressure is supplied to the first fluid controller, the electrolyte located between the check valves flows into the battery cell and the negative pressure is supplied to the second fluid controller at the same time, whereby the electrolyte in the electrolyte tank flows into the space between the check valves. After the electrolyte in the first fluid controller is supplied to the battery cell, the negative pressure is supplied to the first fluid controller, and at the same time, the positive pressure is supplied to the second fluid controller to supply the electrolyte to the battery cell. Repeating above operation can guide the continuous flow of the electrolyte and enable operation of the cell stably.

When the battery module is provided with a plurality of fluid controllers as described above, it is preferable to control a supply cycle of the pressure supplied to the fluid controllers. In above case, it is preferable to apply a pressure change with a different phase rather than with a same phase.

Figure 8A:
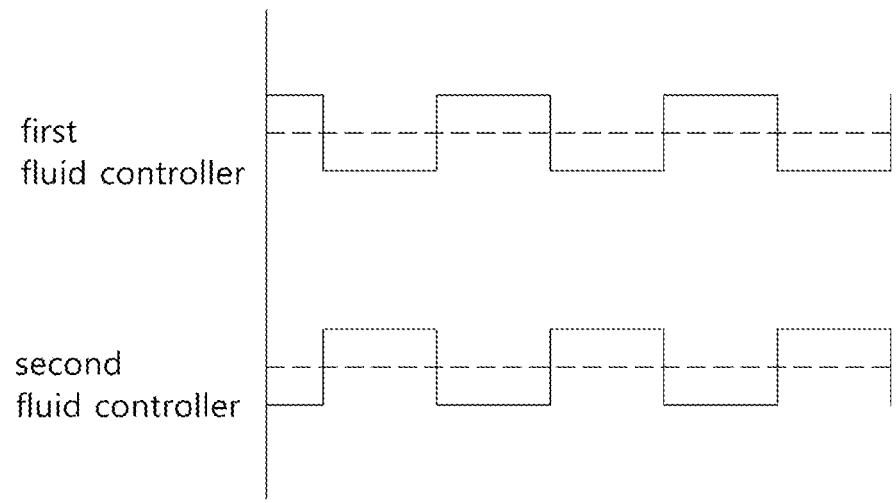
FIGS. 8A to 8C show pressure cycles of each fluid controller when two fluid controllers are provided.
Figure 8B:
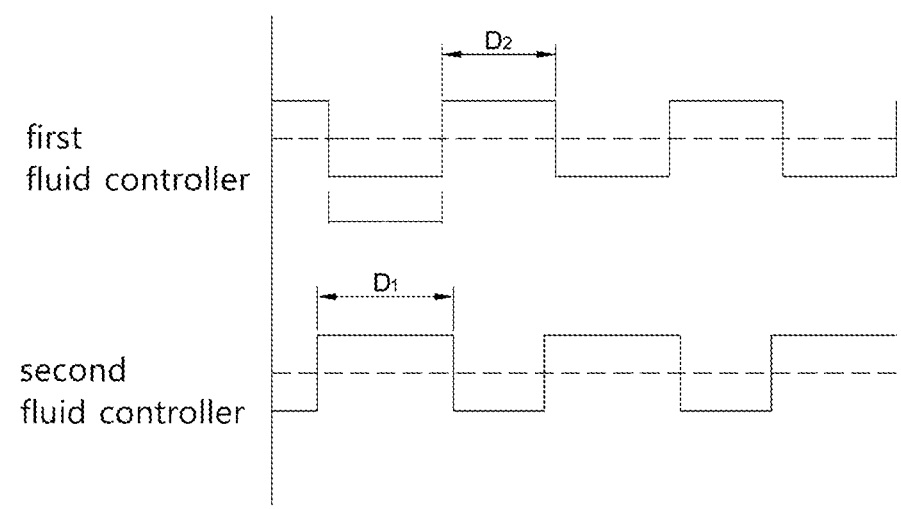
Figure 8C:
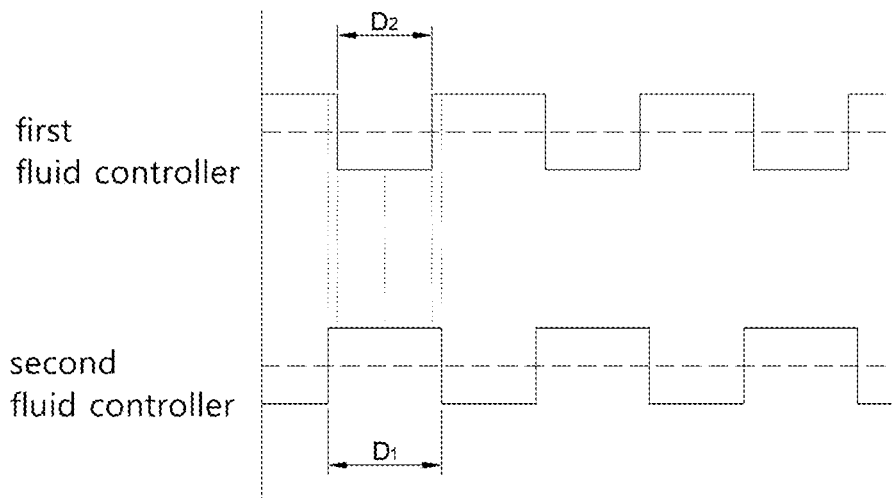

The supply cycle will be described in detail with reference to FIGS. 8A to 8C. As shown in FIG. 8A, when a pressure supply cycle of the first fluid controller and a pressure supply cycle of the second fluid controller are completely converted (mirror image phase) and a positive pressure cycle and a negative pressure cycle of each controller are equal to each other, a constant flow rate of the electrolyte is required to supply to the battery cell. However, at a point where the pressure supply cycle of each fluid controller, less amount of the electrolyte is supplied to the battery cell due to interference from each cycle. That is, the flow rate may be decreased in the point instantaneously.

Therefore, the positive pressure cycles or the negative pressure cycles of each fluid controller preferably are overlapped with each other to prevent disturbance of supplying the electrolyte due to the interference described above.

The supply cycle will be described in detail with reference to drawings. As shown in FIG. 8B, the cycle of each fluid controller is configured to be equal to each other, and for one of the fluid controllers, the positive pressure cycle and the negative pressure cycle have same lengths and for a remaining one of the fluid controllers, wherein a length of the positive pressure cycle is longer than a length of the negative pressure cycle. Alternatively, as shown in FIG. 8C, it is preferable that operating phases of the two fluid controllers are different, and the positive pressure cycles of one of the fluid controllers and the positive pressure cycles of a remaining one of the fluid controllers are overlapped with each other for a predetermined time. That is, it is preferable to adjust a distance D1 of the positive pressure cycle of the one fluid controller to be longer than a distance D2 of the negative pressure cycle of the remaining fluid controller.

The reason is that when the positive pressure cycle and the negative pressure cycle of the fluid controllers have exactly the same length, less electrolyte is supplied to the battery cell than the amount of the electrolyte to be supplied normally. Therefore, in order to supplement the shortage, the length of the positive pressure cycle of one or two fluid controllers is configured to be longer than the length of the negative pressure cycle to keep the electrolyte supplied to the battery cell constant.

The cycles of the two fluid controllers have the same cycles in the drawings. However, the cycles of the two fluid controllers may be the same or different from each other and may be changed in any form on condition that the operating object of the fluid controller described above is achieved.

In addition, when a flow rate of the electrolyte flowing into the fluid controller is less than a flow rate discharged to the battery cell (and when the electrolyte inflow prevention device is not provided or is broken), the fluid, which flows into the fluid controller and is applied with the positive pressure, may flow into the battery cell instead of the electrolyte such that the cell performance may deteriorate. Therefore, it is preferable to adjust the negative pressure and the positive pressure so that the flow rate of the electrolyte flowing into the fluid controller is larger than the flow rate discharged.

In order to adjust the pressure supply cycle of each fluid controller 300 as described above, the fluid controller 300 is preferably provided with a pressure control valve 340 between the pressure generator and the fluid controller as shown in FIG. 9. The pressure control valve serves to alternatively supply the positive pressure and the negative pressure to the fluid controller such that the pressure control valve includes a structure capable of freely controlling opening and closing of a port according to the predetermined pressure supply cycle as described above and all types of corresponding devices.

Figure 10A:
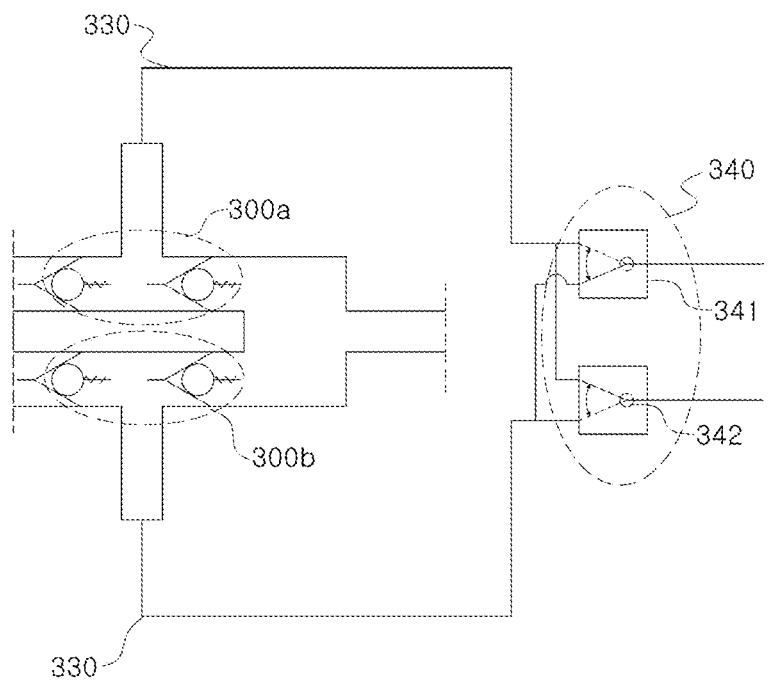
FIGS. 10A and 10B show examples of the pressure control valve.

The pressure control valve 340 will be described in detail with reference to FIGS. 10A and 10B. As shown in FIG. 10A, the pressure control valve may be provided on each fluid transfer line of two different pressure generators. The pressure control valve may include a pressure control valve housing 341 and a switching tube 342 inside the housing. The pressure control valve housing is provided with a tube (inflow tube) having a fluid flow direction that is directed toward an inside of the housing and a tube (discharge tube) which is directed to an outside from the inside of the housing. A switching type of the switching tube is freely adjusted by adjusting the number of tubes.

Figure 10B:
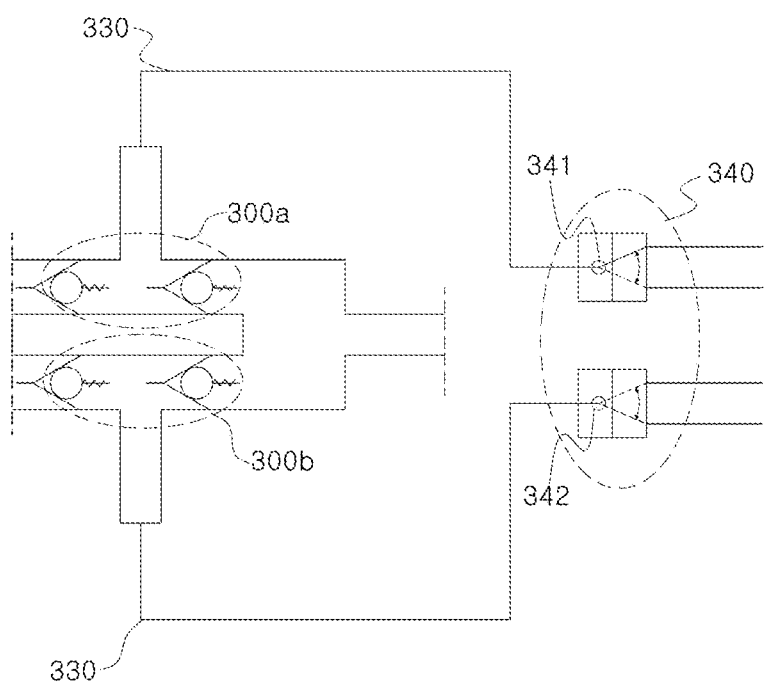

In addition, as shown in FIG. 10B, the positive pressure and negative pressure are simultaneously applied to each pressure control valve 340, and the fluid controller 300 is selectively supplied with the pressure among the positive pressure and the negative pressure in accordance with a required cycle. Alternatively, the pressure control valve 340 may be provided with a separate port or an external valve to generate an intermediate pressure between the positive pressure and the negative pressure such that two pressure supply pipes are connected to each other.

As an example, when one pressure control valve is provided with one inflow tube and two discharge tubes, the pressure control valve has a structure in which the pressure control valve is connected to the pressure generator and the fluid controllers. Therefore, if a type of the pressure needs to be changed while the positive pressure is supplied to one of the fluid controllers, a connection type of the switching tube and the discharge tube is required to be changed to supply the positive pressure to another fluid controller.

As shown in the figure, one inflow tube for the housing and two discharge tubes for the housing may be provided, but two inflow tubes for the housing and one discharge tube for the housing may be provided. Depending on the number of pressure suppliers and fluid controllers, freely adjusting the number of inflow tubes and discharge tubes is not limited in the present invention.

In addition, when the distance D1 of the positive pressure cycle is adjusted to be longer than the distance D2 of the negative pressure cycle as described above, a moment occurs in which the positive pressure is supplied to all the fluid controllers since the positive pressure cycle is longer than the negative pressure cycle. When a switching tube is provided as described above, it is difficult to supply the positive pressure to all the fluid controllers. Therefore, it is preferable that a control valve (not shown) such as a solenoid valve is provided outside the housing instead of the switching tube.

For example, the solenoid valve is connected to the discharge tube connected to each fluid controller and when supplying the positive pressure is required to one of the fluid controllers, the solenoid valve of the discharge tube connected to a corresponding fluid controller is opened. When supplying both the first fluid controller and the second fluid controller is required, the solenoid valves of all discharge tubes are opened to adjust the positive pressure cycle as described above. Alternatively, as shown in FIG. 10B, the positive pressure and the negative pressure may be independently controlled for each battery cell.

Figure 9A:
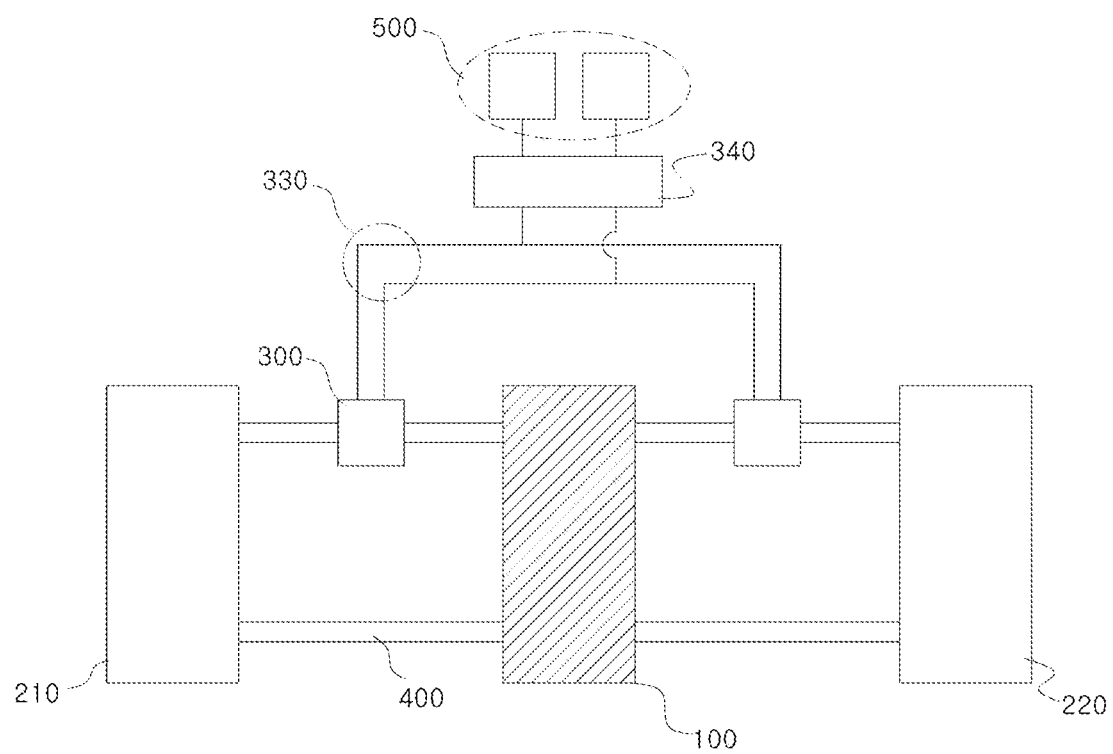
FIGS. 9A and 9B show each fluid controller provided with a pressure control valve.
Figure 9B:
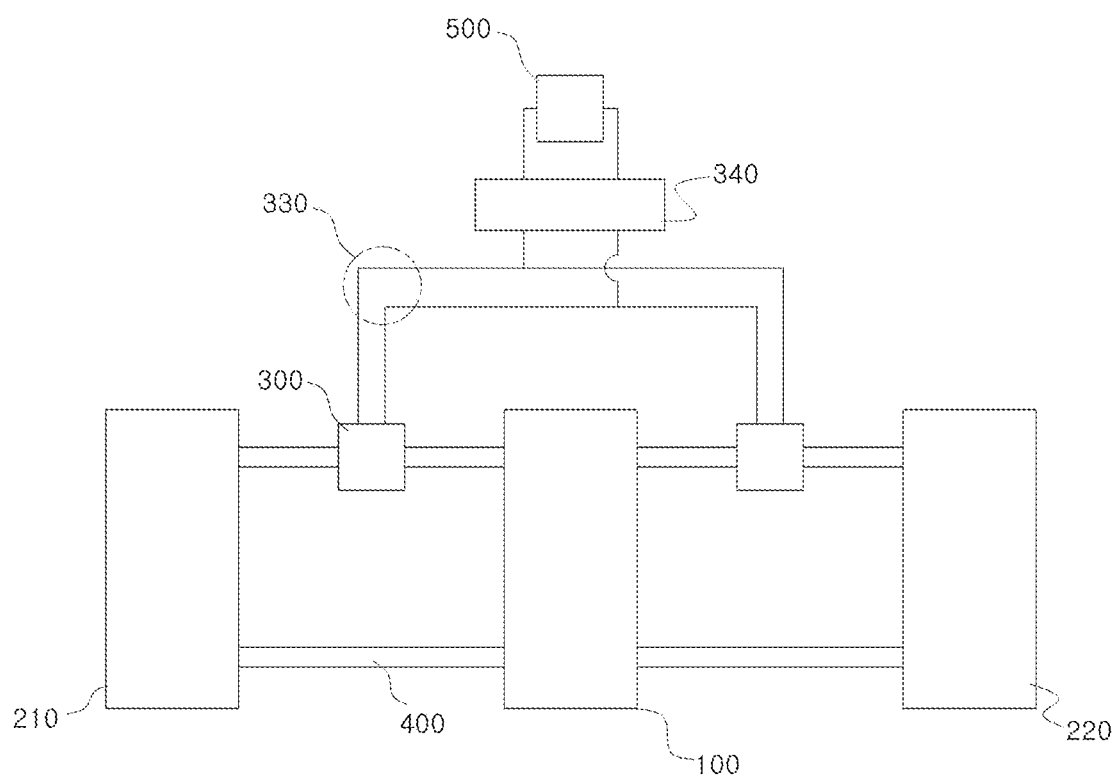

The redox flow battery according to the present invention may be provided with a plurality of pressure generators 500 as shown in FIGS. 9A and 9B, etc. Alternatively, as shown in FIG. 9B, one pressure generator generates the positive pressure and the negative pressure at the same time, and outlets of generated positive pressure and negative pressure are configured to be separated such that energy consumption is decreased and space utilization is maximized.

In addition, the redox flow battery according to the present invention may be provided with the electrolyte inflow prevention device 350 inside the fluid transfer line 330.

In general, redox flow batteries contain vanadium oxide, hydrazine, halogen compounds and other acids whereby acid-resistant transport pipes are required to be used. However, since the particular transport pipe described above is expensive compared to a general pipe, it is preferable to use a general metal pipe, a pneumatic pipe, or a pneumatic tube except the pipe for transferring the electrolyte.

The problem is that in order to apply pressure to the electrolyte flow passage using the fluid, the fluid transfer line supplying the fluid is required to communicate with the electrolyte flow passage, but when positive or negative pressure is supplied, the electrolyte may flow backward toward the fluid transfer line.

Therefore, in order to solve the problem, the fluid transfer line may be provided therein with at least one electrolyte inflow prevention device. Here, the electrolyte inflow prevention device may be selected from a membrane, a shut-off valve, a check valve, and a floating valve, and provided in the fluid transfer line whereby it is possible to prevent the backflow of the electrolyte.

One example of the electrolyte inflow prevention device 350 will be described in detail with reference to FIG. 11. The electrolyte inflow prevention device may be provided at neighboring the fluid transfer line and the controller housing, and floated by the electrolyte. In addition, the electrolyte inflow prevention device may have pores inside a mesh structure, and a surface that may contact the fluid transfer line may be a sheet-shaped object to close the fluid transfer line.

Figure 11:
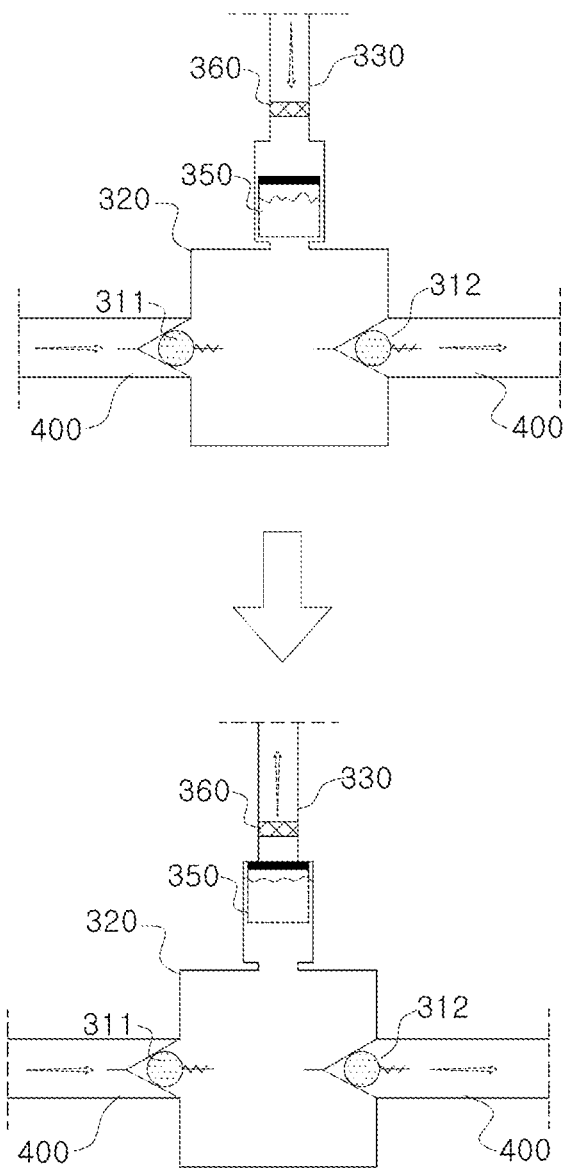
FIGS. 11 and 12 show fluid controllers each provided with an electrolyte inflow prevention device and a fluid filter.

As shown in an upper portion of FIG. 11, the electrolyte inflow prevention device preferably has a diameter equal to or larger than a predetermined size to float inside the fluid transfer line, and the diameter thereof is smaller than the fluid transfer line thereof. Meanwhile, the diameter of a part of the fluid transfer line, which is directly connected to the controller housing, may be smaller than the diameter of the electrolyte inflow prevention device such that the electrolyte inflow prevention device is not detached therefrom.

As shown in a lower portion of FIG. 11, when the negative pressure is applied to the fluid transfer line and the electrolyte level in the controller housing rises, the electrolyte inflow prevention device blocks the fluid transfer line and serves as a valve to prevent the electrolyte from flowing.

However, in case of a floating valve shown in FIG. 11, it is hard to fully prevent the fluid from flowing into the controller housing depending on the operation of the pump supplying the negative pressure and the positive pressure. Therefore, the electrolyte inflow prevention device in a form of the membrane may be introduced to completely cover a cross section of the fluid transfer line as shown in FIG. 12.

The detail will be described with reference to FIG. 12. The membrane completely closes the connection between the fluid transfer line and the controller housing and is made of a resilient material such that the pressure transferred through the fluid transfer line is transferred into the controller housing effectively. That is, when the positive pressure is transferred to the controller housing as shown in an upper portion of FIG. 12, the membrane stretches toward the controller housing from the fluid transfer line according to the positive pressure. Therefore, because the pressure in the controller housing increases, an internal check valve operates accordingly and the electrolyte flows toward the battery cell.

Figure 12:
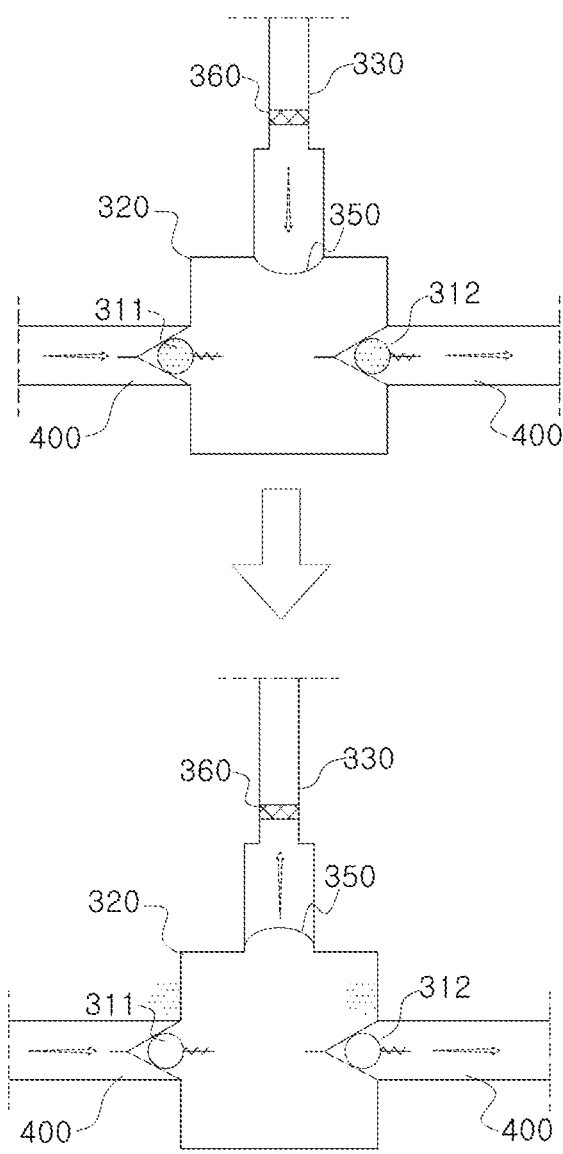

When the negative pressure is transferred to the controller housing as shown in a lower portion of FIG. 12, the membrane stretches toward the fluid transfer line from the controller housing according to the negative pressure. In above case, the internal check valve operates as the pressure in the controller housing decreases and the electrolyte flows into the controller housing from the electrolyte tank.

As shown in FIGS. 11 and 12, the electrolyte inflow prevention device may be provided as a floater or a membrane that deformed by pressure, to completely block the fluid transfer line. However, the present invention is not limited thereto such that the electrolyte inflow prevention device may be provided as a structure in which it is possible to prevent the inflow of the electrolyte and transfer the pressure to the fluid controller.

In addition, the electrolyte inflow prevention device may be provided as a structure at least one different structure is mixed. In other words, at least one electrolyte inflow prevention device such as a floater or a membrane may be mixed for use.

Since the electrolyte inflow prevention device has a structure in which the electrolyte contacts directly therewith, it is preferable that the electrolyte inflow prevention device is made of a material having acid-resistance, and in the case of the membrane form as described above, having fluidity. For example, the electrolyte inflow prevention device may be made of polymers such as polypropylene, polyethylene, and polystyrene, and rubber such as acrylic rubber and fluorine rubber, metal such as aluminum, and the like. In addition, any substance having such physical properties as described above may be used without limitation.

In addition, the fluid transfer line 330 of the redox flow battery according to the present invention may be provided with a fluid filter 360 to remove impurities that can be mixed with the electrolyte.

When the fluid that transfers pressure to the fluid controller is a gas containing air or oxygen, the electrolyte may be oxidized such that charging and discharging efficiency of the battery cell is reduced. In order to solve the problem, the fluid transfer line is preferably provided with a fluid filter as shown in FIGS. 11 and 12 such that impurities such as oxygen are not mixed into the electrolyte. Here, the fluid filter may be installed in each fluid controller or may be installed in one fluid transfer line by connecting the entire fluid controllers, and it is possible to be replaced for repair.

In the present invention, the fluid filter is for removing components such as oxygen and moisture that deteriorates the performance of the electrolyte, in advance. It is preferable that a filter for removing a component that affects the performance of the electrolyte in addition to the above components, and the like is provided. For example, an oxygen scavenger or oxygen removal device may be mounted in a portion of the fluid transfer line.

The redox flow battery according to the present invention may further include an electric terminal for electrically connecting from outside, a controller and a monitor for controlling the fluid controller, etc., and a terminal or connection port for connecting above components.

Further, it is possible to apply the fluid filter to provide a rotating body using a pressure supplied from the outside, and it is possible to configure a pump replacement structure according to rotations of the rotating body.

Figure 13:
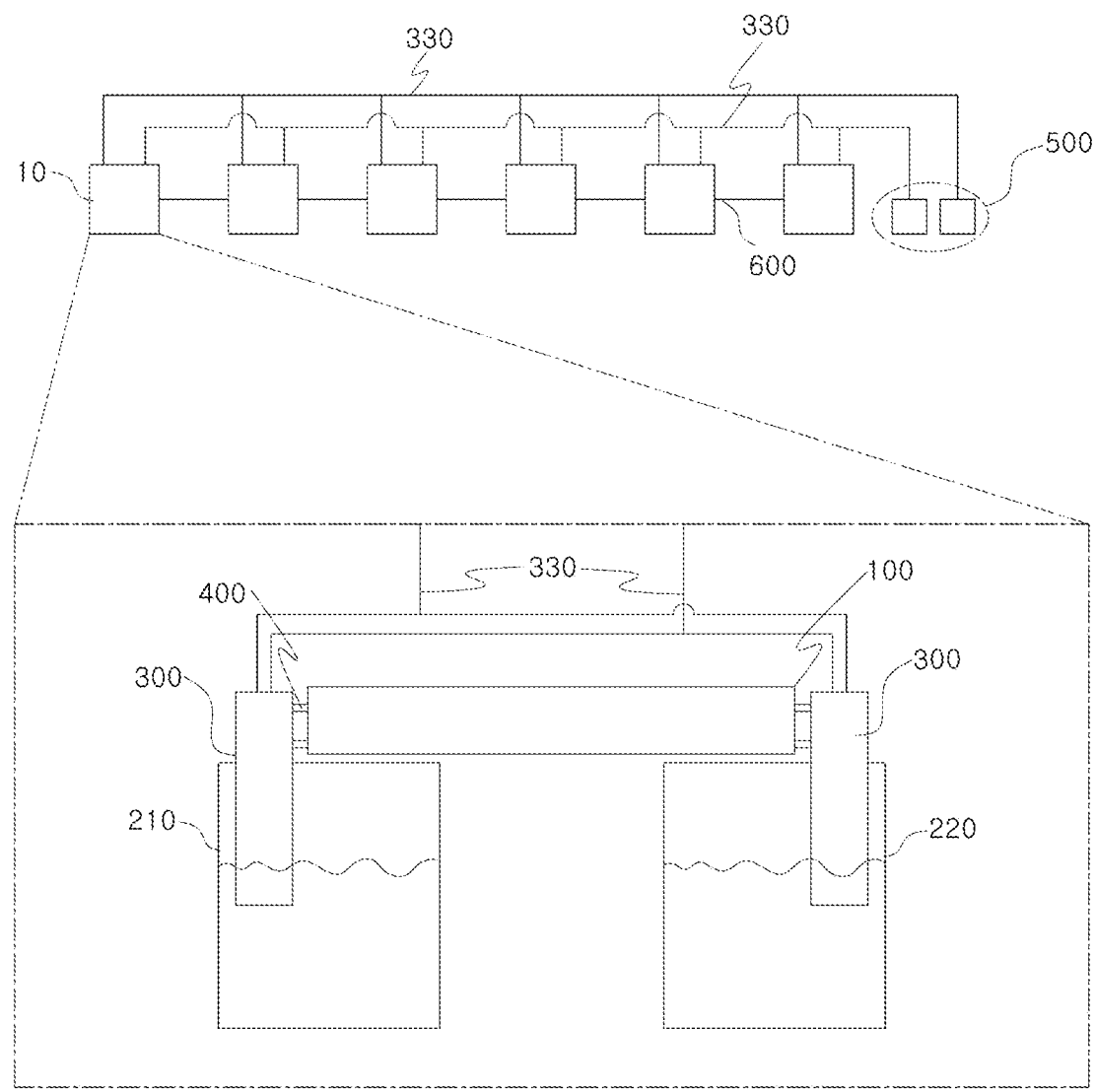
FIG. 13 shows a redox flow battery in which a plurality of battery modules according to an embodiment of the present invention is connected to each other.

FIG. 13 is an embodiment in which a large-capacity system is constructed by connecting a plurality of battery modules described above. The battery modules 100 may be electrically connected in series or in parallel, or may be electrically configured independently. In addition, the battery modules 100 are connected to the pressure generator to transfer pressure from outside for driving the fluid controller of each battery module, and the number of pressure generators may be one or more.

As described above, the redox flow battery according to the present invention can smoothly circulate the electrolyte to an electrolytic cell or a stack without using an expensive chemical pump. In addition, the electrolyte tank can be provided for each battery module or can be shared for a predetermined number of battery modules. Therefore, a circulation distance of the electrolyte is much shorter than a circulation distance of the conventional redox flow battery, whereby a proportion of use of the expensive acid-resistant pipes is greatly reduced.

In addition, since the circulation distance of the electrolyte is short, it is possible to improve the response greatly compared to the conventional redox flow battery, and the shunt current is not generated because the electrolyte tank is detachable and the electrolyte circulates within each battery module.

The redox flow battery according to the present invention effectively realizes a high-voltage and large-capacity energy storage system called an electricity storage through the above-described characteristics. In addition, it is possible to reduce cost since a large number of expensive chemical pumps is unnecessary, and it is possible to improve the efficiency of operation because each battery module can be installed and replaced independently. In addition, considering performance variation of the battery module, it is possible to realize a large-capacity energy storage system by dividing the battery module having similar performances, thereby improving the efficiency of the system.

Hereinafter, the redox flow cell according to the present invention will be described in more detail with reference to examples and comparative example. However, the following examples and comparative example are provided to aid understanding of the present invention, and thus the present invention is not limited by the following examples and comparative example.

The battery cell, the electrolyte tanks, and the fluid controllers were connected as shown in FIG. 7, and the flow rate of the electrolyte was measured by connecting a flow meter to the electrolyte inlet and outlet of each battery cell.

The battery cell used in each example was provided with two carbon electrodes, two current collectors, four gaskets, and one membrane, and active areas of the electrode and the membrane were about 49 $cm^2$. The separator was composed of carbon material and a fluoride membrane was used as the membrane. A vanadium electrolyte was used as the electrolyte and the vanadium concentration was 1.6 mol to 2.0 mol. A specific gravity of the vanadium electrolyte was about 1.4.

In addition, the battery module used in each example had two fluid controllers having a membrane structure, and a flow rate of the electrolyte was about 100 ml/min.

In the battery module constructed as described above, pressure supplied to the fluid controller was regulated to circulate the electrolyte. A pressure supply cycle of the fluid controller was set to 2 seconds, and a positive pressure supply time was adjusted as shown below in Table 1 to repeatedly operate the battery module for 1 minute. A flow rate of the electrolyte discharged from the battery cell was measured every one minute, and an average value was calculated.

TABLE 1

| | Positive pressure supply time (sec) | | Negative pressure supply time (sec) | | Average flow rate (ml/min) | Deviation of low rate (ml/min) | Efficiency change compared to continuous drive |
|---|---|---|---|---|---|---|---|
| | first fluid controller | second fluid controller | first fluid controller | second fluid controller | | | |
| Example 1 | 1 | 1 | 1 | 1 | 100 | −15 | −2% |
| Example 2 | 1 | 1.2 | 1 | 0.8 | 101 | +3 | No effect |
| Example 3 | 1 | 1.4 | 1 | 06 | 101 | +5 | No effect |
| Example 4 | 1 | 1.6 | 1 | 0.4 | 103 | +8 | No effect |

As shown in Table 1, when two fluid controllers were adjusted in same cycle and in different phases from each other (Example 1), a moment when a flow rate lower than the average flow rate occurred. However, as in second to fourth examples, when a phase of the pressure supply cycle of each fluid controller was adjusted differently and a positive pressure supply time of each fluid controller was increased compared to a negative pressure supply time, a flow rate higher than the average flow rate instantaneously occurs such that a flow rate higher than a minimum flow rate required to maintain the cell performance is secured whereby it is possible to operate the cell stably with improved performance.

As described above, the approximate connection structure of the redox flow cell according to the present invention has been described with reference to the preferred embodiments and the comparative example of the present invention. However, those skilled in the art will appreciate that various modifications, additions and substitutions are possible, without departing from the scope and spirit of the invention as disclosed in the accompanying claims.

What is claimed is:

1. A redox flow battery provided with a battery module including a battery cell, an electrolyte tank, an electrolyte flow passage, and a fluid controller through which the electrolyte flows between the electrolyte tank and the battery cell in the electrolyte flow passage, wherein the fluid controller is configured to control the flow of the electrolyte through the electrolyte flow passage by transferring a pressure applied from an outside of the battery module to the electrolyte flow passage, the battery module circulating electrolyte for respective battery modules or for a predetermined number of battery modules independently to charge or discharge the battery.

2. The redox flow battery of claim 1, wherein the battery module includes:
   the battery cell including a pair of electrodes classified into a positive electrode and a negative electrode, a membrane, and a separator stacked on each outer side surface of the electrodes; and
   a pair of electrolyte tanks including the electrolyte tank, the pair of electrolyte tanks provided inside the battery module and configured to supply a positive electrolyte to the positive electrode and a negative electrolyte to the negative electrode;
   wherein the electrolyte flow passage includes connections between the battery cell to each of the electrolyte tanks to transport the positive electrolyte and the negative electrolyte.

3. The redox flow battery of claim 1, wherein the fluid controller includes:
   at least one check valve provided inside the electrolyte flow passage and allowing the electrolyte to flow in one direction; and
   a fluid transfer line coupled to and communicating with the electrolyte flow passage at a location adjacent to the at least one check valve such that the pressure applied from the outside of the battery module is directly transferred to the electrolyte flowing through the at least one check valve at the location.

4. The redox flow battery of claim 1, wherein the fluid controller includes:
   a controller housing provided at an end of the electrolyte flow passage and disposed in the electrolyte tank;
   a fluid transfer line transferring the pressure applied from the outside of the battery module to an inside of the controller housing; and
   a pair of check values provided at opposing sides of the controller housing in a direction of electrolyte flow, the pair of check valves electrolyte to flow from the electrolyte tank to the controller housing and guiding the electrolyte to flow from the controller housing to the electrolyte flow passage at the same time.

5. The redox flow battery of claim 1, wherein the battery module is provided with at least two fluid controllers.

6. The redox flow battery of claim 1, wherein the battery module is provided with two fluid controllers, and a pressure supply cycle of the fluid controller is configured such that respective positive pressure cycles or negative pressure cycles of the fluid controllers are overlapped with each other.

7. The redox flow battery of claim 1, wherein the fluid controller is provided with at least one pressure control valve.

8. The redox flow battery of claim 3, wherein the fluid transfer line further includes at least one electrolyte inflow prevention device selected from a membrane, a shut-off valve, a check valve, and a floating valve.

9. The redox flow battery of claim 3, wherein the fluid transfer line further includes a fluid filter.

10. The redox flow battery of claim 1, wherein the redox flow battery does not include a pump in the electrolyte flow passage.

11. The redox flow battery of claim 1, wherein one but not the other of a positive electrolyte and a negative electrolyte flows through the fluid controller.

* * * * *

UNITED STATES PATENT AND TRADEMARK OFFICE
CERTIFICATE OF CORRECTION

PATENT NO. : 10,665,882 B2
APPLICATION NO. : 15/965866
DATED : May 26, 2020
INVENTOR(S) : Bugi Kim et al.

Page 1 of 1

It is certified that error appears in the above-identified patent and that said Letters Patent is hereby corrected as shown below:

In the Claims

In Column 16, Line 36 (Approx.), Claim 4:
Delete "valves electrolyte" and insert --valves guiding electrolyte--.

Signed and Sealed this
Twenty-seventh Day of October, 2020

Andrei Iancu
*Director of the United States Patent and Trademark Office*